Jan. 18, 1966 C. J. VAN DALEN 3,230,510

VARIABLE CAPACITY INFORMATION STORING TRANSMISSION LINK

Filed Jan. 6, 1959 4 Sheets-Sheet 1

INVENTOR.
CHRISTIAAN J. VAN DALEN
BY
Hugh A. Kirk
ATT'Y.

INVENTOR.
CHRISTIAAN J. VAN DALEN
BY
Hugh A. Kirk
ATT'Y.

Jan. 18, 1966 C. J. VAN DALEN 3,230,510

VARIABLE CAPACITY INFORMATION STORING TRANSMISSION LINK

Filed Jan. 6, 1959 4 Sheets-Sheet 3

INVENTOR.
CHRISTIAAN J. VAN DALEN
BY
Hugh A. Kirk
ATT'Y.

INVENTOR.
CHRISTIAAN J. VAN DALEN
BY Hugh A Kirk
ATT'Y.

United States Patent Office 3,230,510

Patented Jan. 18, 1966

3,230,510

VARIABLE CAPACITY INFORMATION STORING TRANSMISSION LINK

Christiaan Johannes van Dalen, Leidschendam, Netherlands, assignor to De Staat der Nederlanden, ten Deze Vertegenwoordigd Door de Directeur-Generaal der Posterijen, Telegrafie en Telefonie, The Hague, Netherlands Filed Jan. 6, 1959, Ser. No. 785,282

Claims priority, application Netherlands, Jan. 10, 1958, 223,947

14 Claims. (Cl. 340—172.5)

The invention relates to a variable capacity information storing transmission link of the type used in circuits for the transmission of text over teleprinting circuits with error correction. More particularly it deals with a device performing the same services as the FRXD (five unit receiver-transmitter device) of the known type, but of simpler mechanical construction and to make use of the maximum capacity of a transmitter in a telegraph center.

The FRXD acts as an elastic buffer between an incoming line supplying telegraphic information and an error-correcting type printing telegraph transmitter. At any moment the transmitter is ready to transmit a signal, it sends a questing impulse to the FRXD, which performs a step and reads a letter from a tape. The tape carrying the information hangs in a loop between the input and the output tape transporting devices connected to the line. This loop gets longer with every signal supplied and shorter with every signal delivered.

The mechanical complications of this device are mainly caused by the desire of the operator for a keyer to transmit any group of signals from a line integrally, which implies that the scanning device must be designated to climb up the tape loop (in response to questing pulses from the transmitter) until it has scanned all the signals belonging to a message sent over the line previous to the interruption of the supply of tape to the loop. The invention provides a limited electrical memory to cover the interval between the supply of a part of the tape to the recording head O and its delivery by the reading head W, a loop of minimum length remaining constantly between these two heads or devices.

The storage device according to the invention has a minimum capacity equal to that of the minimum length loop. Means have been provided to ensure that the questing pulses scan the electrical memory and the tape memory in a correct order of sequence.

The invention is especially applicable to keyers of the magnetic wire recorder type.

Two embodiments of devices of this type will now be described with reference to the drawings.

Figure 1:
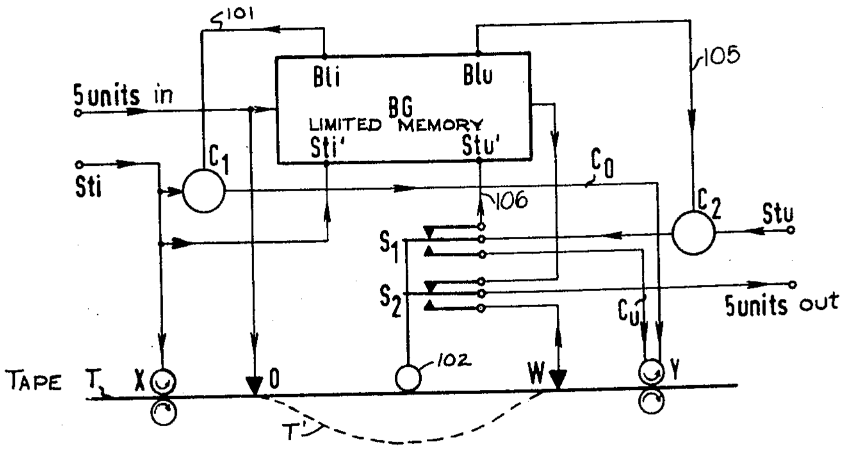
FIG. 1 shows a schematic block wiring diagram of a circuit according to a first embodiment of this invention.

The device according to FIG. 1 is supposed to be connected to an incoming line, such as a subscriber's line, via which telegraph signals are sent to the apparatus shown. These signals arrive sequentially via the wire designated by "5 units in" or "5 in units," the rate at which the elements of these signals arrive being indicated by pulses on the incoming rhythming wire S*ti* and dots on vertical line X in FIG. 2.

Figure 2:
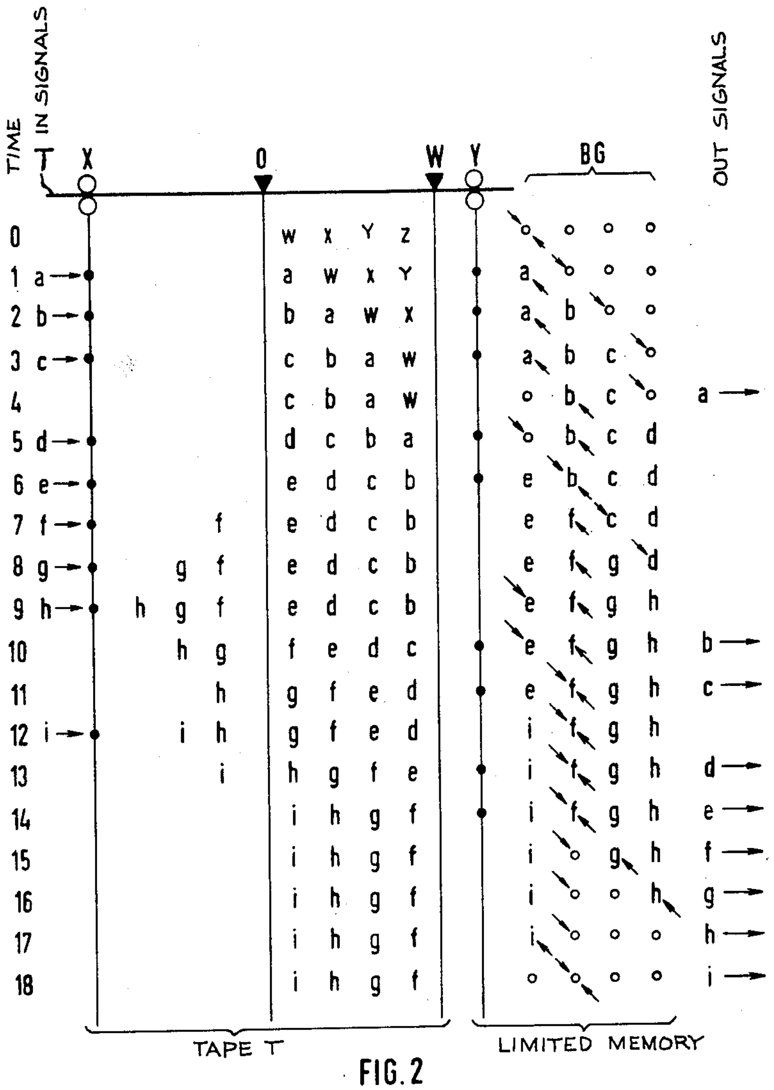
FIG. 2 is a time diagram illustrating the operation of the circuit of FIG. 1.

In FIG. 2 the series of numbers increasing from top to bottom indicates the progress of time. The columns X, O, W, Y and BG relate to the components designated by the same reference letters in FIG. 1. The letter column at the left of the vertical X shows signals *a*, *b*, *c*, etc. arriving from the subscriber's line "5 in units," the farthest right hand column shows when these signals *a*, *b*, *c*, etc. are passed to the transmitter. Column X shows the impulses by dots which cause the roller X in FIG. 1 to step, when signals arrive via the wire "5 in units." So if a letter "*a*" arrives, it is recorded by the recording head O, the tape T being moved forward by one step, so that its next empty place (from the left) is moved up at time or movement position 2.

Figure 3:
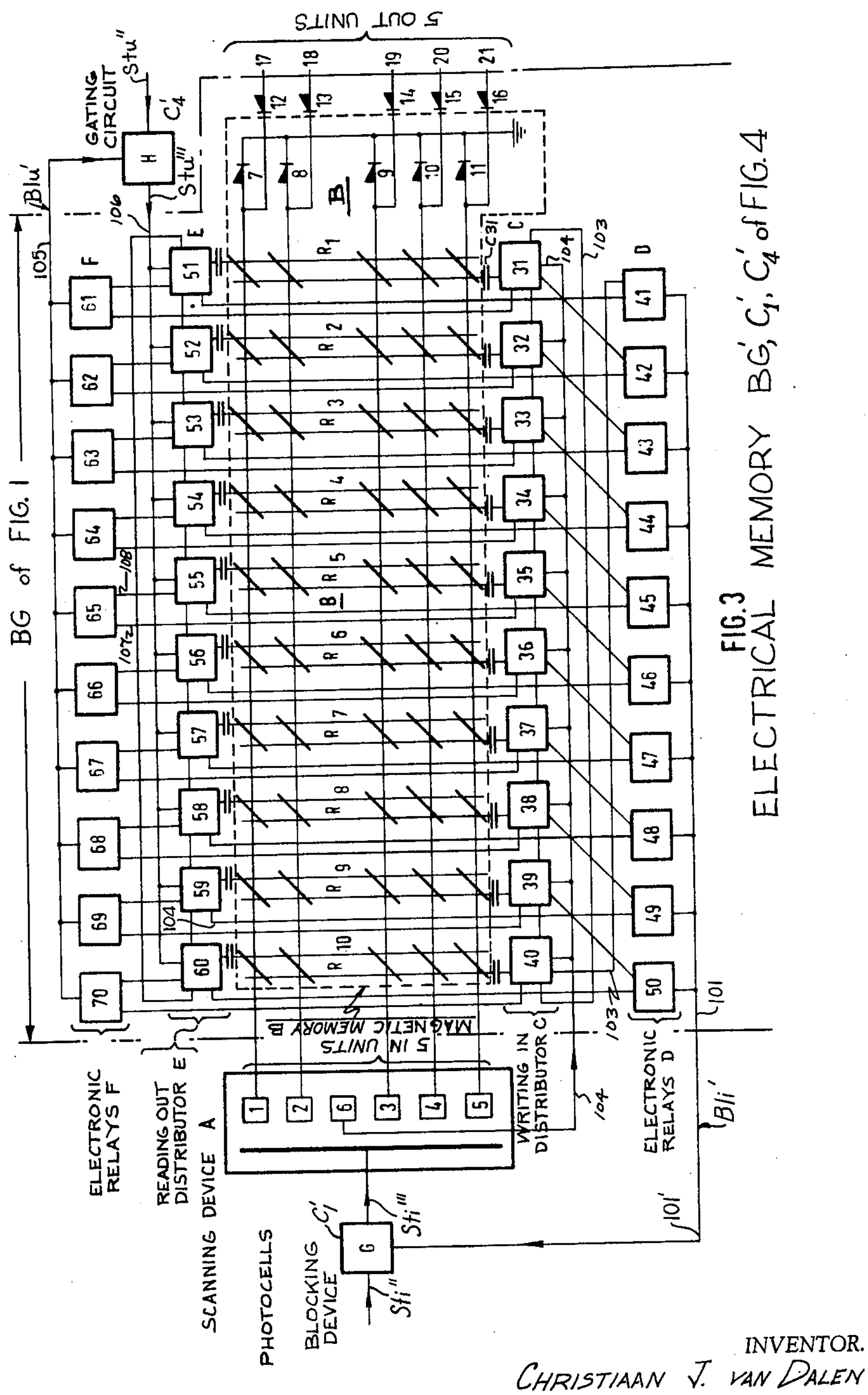
FIG. 3 represents a schematic block wiring diagram of the electrical memory device shown in FIG. 1 or 4.

According to the invention as exemplified in FIGS. 1 to 3 *n* signals ($n=4$ in this example) are recorded in the tape T and in the limited electrical memory device or circuit BG, *n* being the minimum capacity of the loop of tape T between the recording head O and the reading head W, as well as the capacity of the limited memory BG. The said *n* signals are the last signals offered by the subscribed. This double recording provides the possibility of passing these *n* signals from BG to the transmitter, the last *n* signals (*i*, *h*, *g*, and *f*) remaining in the tape, when the output tape transporting device Y has made its last step (FIG. 2, moment 14).

The output tape transporting device Y receives its controlling impulses from the incoming rhythm wire S*ti* through the electronic relay $C_1$ (such as a rectifier or diode gates) and the conductor $C_0$. At each supply of a signal an impulse passes to output transmitting device Y, unless BG has received four signals already (moment 7). From this moment 7 signals offered in excess of the number *n* are stored and remain in the loop (in FIG. 2 these signals are indicated at the left of vertical O) awaiting the arrival of a questing pulse via output control wire S*tu* from the transmitter in FIG. 1 causing said signals to be drawn into the minimum length loop for the tape T. The fact is that as a result of a further supply of signals (*f*, *g*, *h*, *i*, etc.), the loop length has exceeded its minimum and it will only return to this minimum after the delivery from tape T of a corresponding number of signals *b*, *c*, *d*, etc. (see right side of FIG. 2) to the transmitter, i.e. after moment 14.

From moment 7 or after the memory BG is full, that is contains four signals, pulses offered from wire S*ti* can no longer reach the output transporting device Y because of operation of electronic relay C1 from memory BG through conductor 101. This device Y then only can be controlled by questing pulses from wire S*tu* through electronic relay C2, switch S1 and conductor C*u*. Switch S1 operates with switch S2 after the loop length of tape T between heads O and W has exceeded its minimum and sags T′ as shown in dotted lines to permit the taut tape feeler or roller 102 on the operator of switches S1 and S2 to drop or move off their normal positions as shown in full lines in FIG. 1.

It is to be observed that in the embodiment according to FIG. 1 the signals recorded in the minimum loop can be removed from it, when the slack tape T′ is moved step-by-step past the reading head W, as a result of which signals are sent via now operated switch S2 and the conductor "5 units out" or "5 out units" to the transmitter. If the tape is taut, however, signals can be removed from it only when a fresh signal is offered, such as, at moment 6 in FIG. 2, the signal "*e*" is recorded at the cost of the "*a*," which was recorded at moment 1. But this "*a*" is moved past the reading head W without influencing it, as switch S2 is in the position corresponding to the taut tape T′ as shown in full lines in FIG. 1.

Thus after moment 6 impulses wire S*ti* do not reach the output tape transporting device Y any longer, until at moment 10 a questing pulse from wire $St_u$ passes to device Y, which is possible then due to the change-over of switch S1 as the tape is still slack T'.

From moment 14 the letters *i, h, g* and *f* remain in the loop of the tape T.

At the beginning of the recording (moment 1, letter "*a*") the recording of the "*a*" on the tape T was accompanied by the removal of the "*z*" from the tape T, which "*z*" had been left from the preceding message. This removal of "*z*" occurs under the control of a removing pulse, indicated by the first dot from the top on vertical line Y in FIG. 2. In this way the signals *w, x* and *y* are successively removed from the Tape T. In an analogous way the tape moves past the reading head W again at moment 9.

Now the recording of signals in and the removal of signals from the limited memory BG will be described.

The memory BG shown in FIG. 1 may comprise a limited number of bi-stable multivibrators or the like, or it may comprise magnetic rings in a circuit similar to that shown in FIG. 3.

On receipt of a pulse from wire $St_i$ a part of the pulse energy flows via electronic relay $C_1$ and conductor $C_0$ to the output tape transporting device Y, a part passes to terminal $St_i'$ of memory BG, and a part reaches the input tape transporting device X.

The last mentioned two parts are always effective: the impulse sent to the device X serves to ensure the recording of the signal series *abcde* on the minimum length loop of the tape T and of the signal series *fghi* on the longer loop of the tape T', while the impulse to the memory BG controls the successive recording of signals supplied from the wire "5 in units," or the substitution of these signals for earlier recorded signals. At the beginning of the message *abcdefghi,* the register or memory BG is empty. This is only possible, if a sufficiently long time has elapsed since the arrival of the signals *wxyz* to have them removed from the memory in normal operation although they are still present on the tape, since they are stored only temporarily in memory BG, as will appear further on.

When the "*a*" is recorded on the tape T (FIG. 2, moment 1), it is also stored in memory BG. A distributor C (see FIG. 3) in the memory BG indicates for each fresh or new incoming signal to be recorded, the place where it is to be stored in memory circuits BG. Thus, in FIG. 2 as is indicated by the slanting arrows pointing in a downward direction, the first place from the left is indicated at moment 0, the second, third and fourth places from the left at moments 2, 3 and 4, the first place from the left again at moment 5 (the "*a*" having been removed from this place at moment 4), the second place from the left at moment 6 (which still contains the "*b*" but which will be replaced by the "*f*" at moment 7).

At moment 4 the letter "*a*" was removed from the limited memory BG by a questing pulse. The gaps in the vertical line X mark moments at which questing pulses appear, the signals transmitted at these moments being indicated at the farthest right column in FIG. 2. Thus when questing pulses arrive from the wire $St_u$ via switch S1 to terminal $St_u'$, they look up the signals indicated in FIG. 2 by slanting arrows pointing in an upward direction in vertical columns BG. Thus the first signal in the first storing unit of BG is looked up for removal from the memory BG at moments 0 through 3, the second signal in the second storing unit of BG at moments 4 through 9, the next signal in the first storing unit again at moment 17, and the next signal in the second storing unit again thereafter at the moment 18. The slanting arrow pointing in an upward direction moves forward by one place at every signal delivered or removed from the memory BG (see column of signals at farthest right in FIG. 2), like the slanting arrow pointing in a downward direction moves forward by one place at every recording of a signal in the memory BG. In the column quite at the left of FIG. 2 the offered signals have been indicated. At moment 6 the place of the "*b*" recorded at moment 2 is indicated in the memory BG as the place where the next signal received from "5 in units" must be stored. In the present example this next signal is the letter "*f*." So the "*b*" is overwritten. Next the turn is to the "*c*," etc. The letters "*b*" and "*c*" could only have been saved, if a questing pulse had arrived ultimately at moment 6, so that they would have followed the "*a*" delivered at moment 4. In the course of things under discussion they are not lost, however, as they have been recorded. The last two places of this tape T are not allowed to pass the reading head W after moment 6, as from this moment, the memory BG is full and electronic relay C1 is opened by an impulse via conductor 101 from memory BG that it is full, which then prevents the offering incoming pulses from reaching the output tape transporting device Y.

Thus from moment 6 the tape loop T' hangs slack, the next questing pulse, appearing at moment 10, reaches device Y via conductor $C_0$, the "*b*" being passed on to the transmitter from the tape T' via reader W and switch S2 to "5 units out" terminal. The "*c*," and the "*d*," and the "*e*" on the tape T' are passed on in the same way at moments 11, 13 and 14, respectively.

The loop of the tape T is now taut again, and the next questing pulses are passed to memory BG again, where they select signals according to the upwardly slanted arrows, which leads to the transmission of the letter "*f*" at moment 15 and of the letters "*g*," "*h*" and "*i*" at moments 16, 17 and 18, respectively.

FIG. 3 shows a circuit arrangement of a limited memory BG, in which $n=10$, the operation of which is as follows: The figure shows diagrammatically a device for writing in information from an information bearer in a memory combined with a reading device. The component parts are a scanning device A by means of which the information bearer, such as a subscriber tape (not shown) is scanned and transmitted (via the "5 units in" terminal of FIG. 1) to a memory B in which, by way of example, ten signals can be stored, an input counter and distributor C which cooperates in writing-in information in the memory, a number of electronic relays to prevent rewriting of signals, such as diode gates D, an output counter and distributor E which cooperates in reading-out information from the memory B, and a number of electronic relays to determine if the memories are empty, such as diode gates F. The scanning device A comprises a number of photocells (1 through 6). The photocells 1 through 5 scan the signal perforations in the subscriber's tape and photocell 6 scans the transport perforations.

The information bearer or subscriber's tape can be drawn through the scanning device A at any desired speed by means of a small motor (not shown). The motor can be stopped by means of a blocking device G. At the beginning of the recording operation this device G is put in the deblocking state. If a photocell detects a hole in the tape, a voltage (positive) appears via an amplifier (not shown) at the conductor connected to this photocell, otherwise this conductor is at ground potential.

It is to be observed that the transport holes in the subscriber's tape have a smaller diameter than the signal holes. Due to a swinging movement of the tape the signal holes may be shifted with respect to each other in the direction of the length of the tape. A line drawn through the center of the transport hole and perpendicularly to the direction of transport of the tape will no doubt nearly always pass through a detectable part of all of the signal holes. The conductors of photocells 1 through 5 (or "5 in units") are grounded via the memory B and a number of rectifiers 7 through 10. Further these conductors are connected via a number of rectifiers 12 through 16 to the output terminals 17 through 21 ("5 out units") of the memory B. At these terminals 17 through 21 the memory is removed or read out by a transmitter. A positive voltage at these conductors in the memory B cannot reach the output terminals 17 through 21, as the grounded rectifiers 12 through 16 prevent this. Each of the conductors connected through photocells 1 to 5 contains a first energizing winding for the relevant schematically shown magnetic cores R1 through R10 of the memory B as shown in FIG. 3. Second energizing windings for the cores are inserted in the conductors connected to the respective output terminals of the units 31 to 40 of the distributor C.

This distributor C is a so-called ring distributor, in which each unit controls the next one, the last one controlling the first one again via conductor 103. All of the units of the distributor C are also connected via conductor 104 to the output terminal of photocell 6. A transport hole for photocell 6 causes a positive voltage at its output terminal which is applied to all the distributor units 31 through 40, but only the unit following the one which was active last is effected by this positive voltage to become active. If a positive voltage appears at both energizing windings the relevant core is magnetized to take state "1."

If the memory B is empty at the beginning, the appearance of a first signal in the scanning device will cause unit 31 of the distributor C to deliver at its output terminal via a capacitor *c*31, a positive voltage (pulse) to the second energizing windings of the cores $R_1$ in the memory B. Of these five cores $R_1$, the ones of which their first energizing windings also are supplied with a positive voltage from a positive pulse from the output terminals of photocells 1 through 5, will assume the "1" state.

The appearance of a second signal in the scanning device will cause unit 32 of distributor C to deliver a positive voltage to the second energizing windings of cores $R_2$ in the memory B. Of these five cores $R_2$ the ones of which the first energizing windings too are supplied with a positive voltage will assume the "1" state. Thus the memory B will be entirely or partly written-in with information or stored signals.

If e.g. the memory B has been filled up to and including the seventh group of cores ($R_7$) a next offering of signals to the scanning device will cause unit 38 of the distributor C to supply a positive voltage to the second energizing windings of cores $R_8$ in the memory.

The memory B has been so arranged that if e.g. the memory has been read out up to and including the ninth row, the memory B can only be written-in up to and including the eighth group of cores in a next writing-in period. This has been achieved by means of electronic relays D or 41 through 50. With a view to the reading-out of the ninth group of cores, the unit 59 of the reading-out distributor E (to be described further) has become active, delivering at its output terminal a positive voltage via conductor 104 to the input terminal of electronic relay 49. If in a next writing-in period the eighth group of cores is written in, unit 38 of distributor C becomes active, supplying equally a positive voltage to electronic relay 49. Then there appears at the output terminal of electronic relay 49 a voltage via conductor 101 which indicates that no more signals are to be recorded in the memory B and may cause the motor deblocking device G to operate to stop the motor for driving the subscriber's tape through the scanner A. This arrangement serves to make sure that no recording takes place in groups of cores that are not yet read-out as in the case for the embodiment of FIG. 4 described later. For the reading-out of the memory B, use is made of a gating circuit H, which receives quenching pulses from a transmitter or data processing machine and which passes on impulses via a common conductor 106 to all units 51 through 60 of distributor E. This distributor E also is of the ring type.

A first pulse will activate that distributor unit which follows the unit activated last. Suppose unit 51 becomes active. Then a voltage (negative) appears at the output terminal of unit 51 and is applied to the relevant windings of the cores of group $R_1$. These cores, which were in the "1" state, will now assume the "0" state and consequently, deliver negative voltages at the relevant output terminals 17 through 21 ("5 out units" terminal in FIG. 1). Negative voltages appearing are blocked from being grounded by the rectifiers 7 through 11. A next pulse from gating circuit H will activate unit 52 of distributor E. A negative voltage appears at the output of this unit and is applied to the relevant windings of the cores of group $R_2$. These cores which were in the "1" state will assume the "0" state and, consequently, deliver negative voltages at the relevant output terminals 17 through 21.

If, for example, the memory B has been written-in up to and including the fifth group of cores $R_5$, it will be read-out up to and including this fifth group as follows: When the fifth group of cores was written-in, unit 35 of distributor C became active and applied via its output terminal and conductor 107 a positive voltage to the electronic relay 65 of electronic relay group F. When now the fifth group of cores is reached and read-out, unit 55 of distributor E becomes active and equally applies via its output terminal and conductor 108 a positive voltage to the electronic relay 65, which relay 65 now acts as a gating circuit and delivers an impulse via conductor 105 to gate H, which, in turn, consequently, stops the delivery of reading-out pulses via conductor 106 and the reading-out comes to an end.

Figure 4:
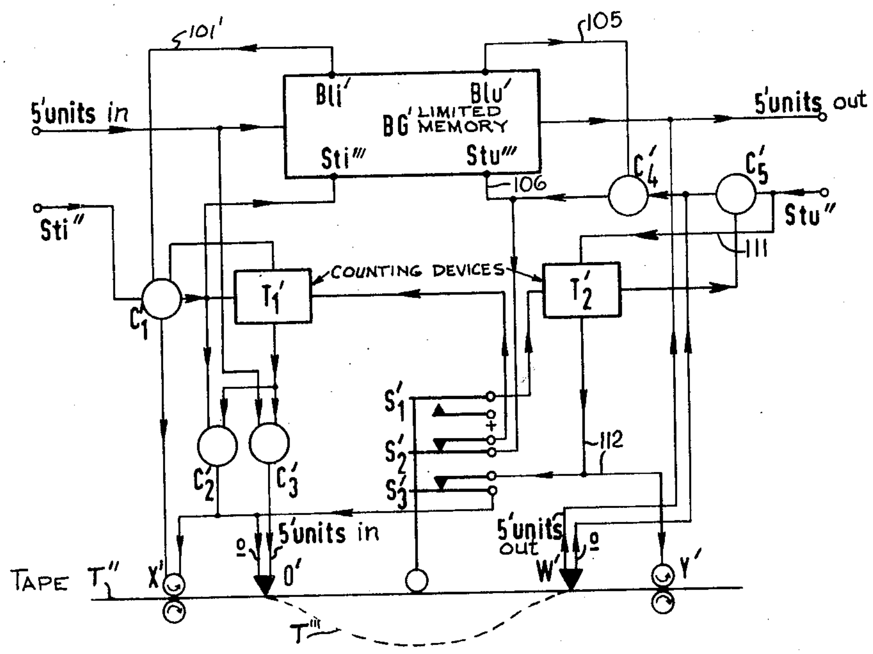
FIG. 4 shows a schematic block wiring diagram of a circuit according to a second embodiment of this invention.
Figure 5:
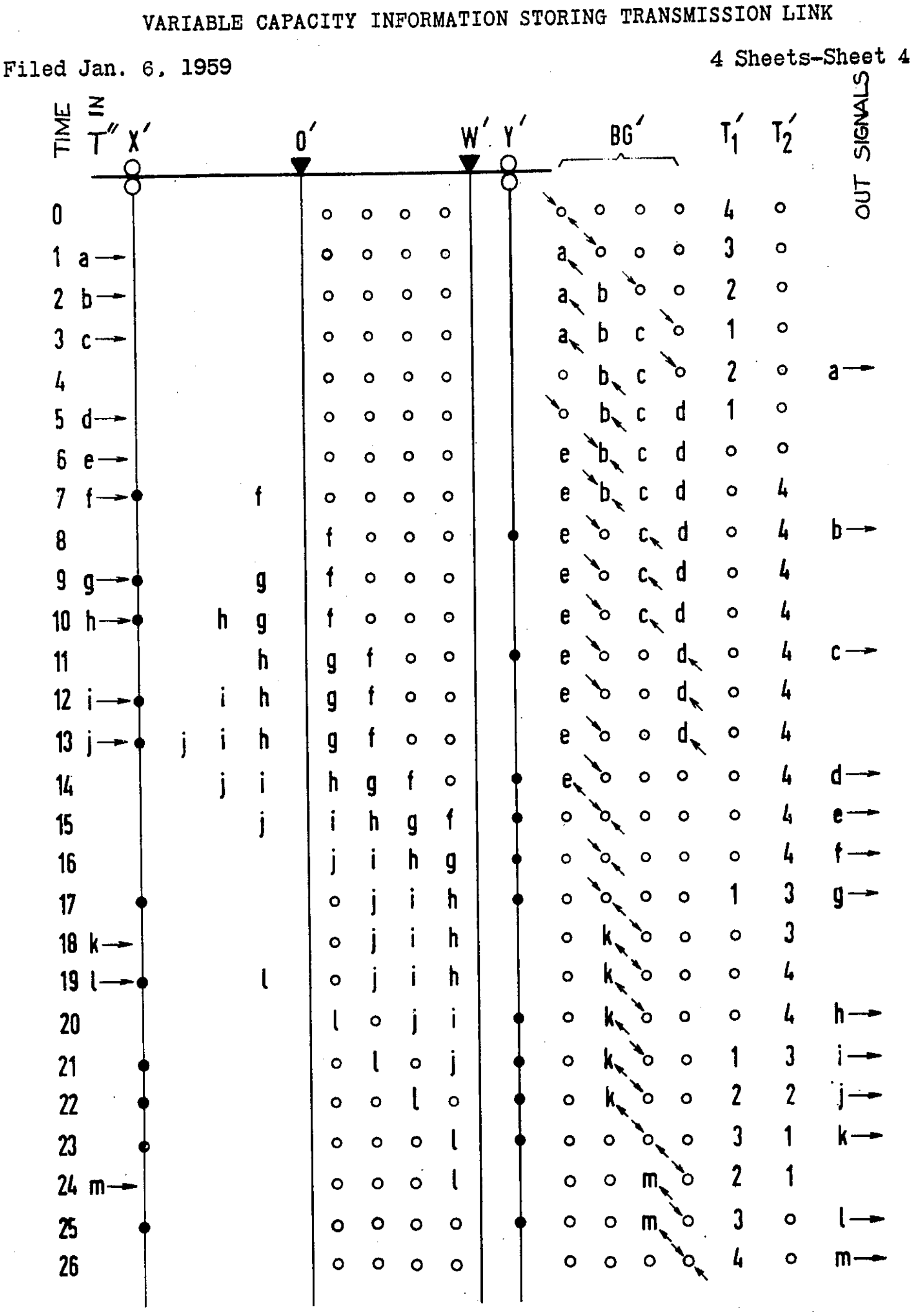
FIG. 5 is a time diagram illustrating the operation of the circuit of FIG. 4.

FIGURES 4 and 5 illustrate another embodiment of the invention. In this embodiment many characteristic parts correspond to those in FIGS. 1 to 3. Notably the arrangement of memory BG and tape T″ is quite the same as memory BG and tape T in FIGS. 1 to 3. The most important difference resides in the fact that memory BG′ (e.g. a magnetic core memory) is used preferably and exclusively, the tape only taking up the overflow, as is indicated in FIG. 5.

In the time diagram of FIG. 2, as well as in FIG. 5, the portion between vertical columns X or X′ and O or O′ contains the signals offered by the subscriber and recorded in the slack loop T′ or T‴ at the right of the recording head O or O′ in FIG. 1 or 4. The columns between vertical lines O or O′ and W or W′ contain the signals recorded in the taut tape T or T″ between the recording head O or O′ and the reading head W or W′. Column $T'_1$ in FIG. 5 indicates the numbers of signals which can still be recorded in the memory BG′ before it is full, and column $T'_2$ indicates the number of times questing pulses from terminal wire S*tu*″ must be sent to the output tape transmitting device Y′ before the tape T′ is read out. At moment 1 in FIG. 5 the letter "*a*" is offered by the subscriber's line. It is recorded in memory BG′ in the first place, as this place had been indicated at moment 0 by the slanting arrow pointing in a downward direction, in the same way as in FIG. 2.

The second place is reserved for the next signal to be recorded. Consequently, the letter "*b*" is recorded in this place at moment 2. The slanting upward arrow which indicates the place to be scanned points already from moment 0 to said first place, or vertical column from the left, and continues to point to this place, until at moment 4 a questing pulse from the transmitter entails the removal of the letter "*a*" from memory BG. At this moment the upwardly slanted arrow moves forward to the next place, in which the "*b*" has been recorded, and continues to indicate this second place until the arrival of the next questing pulse at moment 8, etc.

The signals from memory BG′ reach the transmitter via the wire marked "5 out units" in FIG. 4. Each signal removed from memory BG′ leaves an open place (moment 4), which is released before being designated in the course of the further operation (moment 5) for the recording of a signal and is refilled (moment 6) with the signal which is next at that moment.

In this example there is no overwriting. There are two counters, of which one, $T'_1$, counts the number of places available in the memory BG′. When this number has fallent to zero, the next signal arriving ("*f*" at moment 7) is recorded in the slack loop (moment 8), for which the input tape transporting device X′ receives an impulse from the control wire S*ti*″, notably via the electronic relay $C'_1$ (such as diode gates) which, controlled by terminal B*li*′ of memory BG′ over conductor 101′, is opened for this direction, as soon as the memory BG′ is full (as at moment 6, FIG. 5).

At this time, electronic relays $C'_4$ and $C'_5$ in FIG. 4 are blocked because the memory BG′ is full. If the counting device $C'_2$ in FIG. 4 is not at zero, it blocks the electronic relay $C'_5$, preventing it from transmitting questing pulses to the electronic relay $C'_4$. That the questing pulses do reach $C'_4$ at moments 15 and thereafter is due to spaces passing the reading head W′, when the output tape transporting device Y′ responds to questing pulses transmitted via conductor 111, device $T'_2$, and conductor 112, when device $T'_2$ is not in the zero state.

Every time a questing pulse arrives, which means that counter $T'_1$ must increase its count by one, counter $T'_1$ receives a part of this pulse via contact $S'_2$, which is closed if the tape T″ is taut.

As indicated from the diagram in FIG. 5 the count of $T'_1$ amounts to four, when memory BG′ is empty. It is decreased by one count at each recording of a signal in the memory BG′, that is at moments 1, 2, 3, 5, 6, 18 and 24. It is increased by one count when a signal passes from the memory BG′ to the transmitter via the "5′ out units" terminal, provided there are all spaces at the left of the vertical lines W′ in a taut loop T″, that is at moments 4 and 26. It is also increased by one count every time a space is introduced at the left of the vertical line W′ in the taut loop T″ due to the delivery of a signal to the transmitter at the right of the taut loop T″, that is at moments 17, 21, 22, 23, and 25.

The above-mentioned conditions are satisfied by means of contact $S'_2$, via which a pulse for counter $T'_1$ tending to increase the count can only be delivered from the questing pulse in the case of a taut loop T″. The tape T′ is taut from the moment it has delivered its whole stock (moment 25) to the moment a first signal is recorded in the tape (moment 7), that is, while there is nothering recorded on tape T″. When the letter "*f*" is offered at moment 7 the pulse from wire S*ti*″ is passed by now opened (because memory BG′ is full) electronic relay $C'_1$ to input transporting device X′. As a result of this input transporting device X′ makes a step, so that the tape becomes slack and switches S′ are changed over. Consequently, a positive potential from now closed switch $S'_1$ is passed to counting device $T'_2$, which then goes to its count or state of 4. Therefore, at moment 8 the questing pulse arrives via conductor 111, counting device $T'_2$, and conductor 112 to the output tape transporting device Y′, because the counting device $T'_2$ blocks electronic relay $C'_5$ when it is not in the zero state. This device makes a step (moment 8), drawing the tape taut again.

At moment 9 the tape becomes slack again due to the introduction of the signal letter "*g*," and is only drawn taut again at moment 16, when Y′ makes a step in response to pulses supplied to it via counter $T'_2$ at moments 11, 14, 15 and 16. At the first mentioned two moments spaces are delivered from the tape T″ (letters "*c*" and "*d*" being delivered from memory BG′); at the last-mentioned two moments a space (coinciding with the delivery of the letter "*e*" from memory BG′) and the letter "*f*" are delivered from the tape T″.

From moment 16, a questing pulse intended for output tape transporting device Y′ is also sent to input tape transporting device X′ via now closed switch $S'_3$. At moment 17, a space or nothing is recorded in the tape T″ due to the absence of offered signals. The letter "*k*" offered at moment 18 is not recorded in the tape T″ because such a recording is blocked by the electronic relay $C'_3$ controlled by the counting device $T'_1$, which is not in its zero state indicating that a signal can now be recorded in the memory device BG′. When the tape T″ is being scanned at moment 23, the space recorded in the tape T″ will control through reading head W′, electronic relay $C'_4$ and output terminal S*tu*″ the limited memory BG′, which then passes the letter "*k*" recorded at moment 18 to the transmitter via the "5 out unit" terminal.

Now the memory BG′ is empty again so that its output terminal B*lu*′ will control electronic relay $C'_4$ and further questing pulses can no longer reach memory BG′. Thus the next questing pulse will only be able to reach the tape transporting device Y′ and via switch contact $S'_3$ and also to the tape transporting device X′, so that the taut tap T″ is moved, the letter "*l*" is read.

At moment 24 the letter "*m*" is recorded in memory BG′. Recording in the tape T″ would cause three spaces to be inserted between the letter "*l*" and the letter "*m*." Therefore the "*m*" is recorded in memory BG′ in the place indicated by the upwardly directed arrow, so that it can be read at the next questing pulse from S*tu*″ which electronic relay $C'_4$ lets the questing pulse pass this time, because B*lu*′ now marks the non-empty state of the memory BG′ now.

The memory BG′ is analogous to the one used in the installation acording to FIG. 2 and represented in FIG. 3. It works as described above with the only difference that the voltage appearing at output terminal to indicate the empty state of the memory, is utilized in the electronic relay $C'_4$ to block the input terminal from responding to questing pulses.

Thus such a questing pulse, which is stopped by the electronic relay $C'_4$ as well as by counter $T'_2$ does not succeed in provoking the delivery of a signal from the limited memory BG′ which blocks the electronic relay $C'_4$ as a result of its empty condition, or from the tape T′ which is empty, since counter $T'_2$ is at zero. So the transmitter either does not operate, or it transmits an idle time signal.

While I have illustrated and described what I regard to be the preferred embodiment of my invention, nevertheless, it will be understood that such is merely exemplary and that numerous modifications and rearrangements may be made therein without departing from the essence of the invention.

I claim:

1. A transmission link having a variable memory capacity for temporarily storing information between a source of information connected to an incoming line and an information outlet connected to an outgoing line, said link comprising:

(I) a first information registration means comprising:
- (a) a flexible recording tape,
- (b) a recording head being connected to said incoming line,
- (c) a first means for separately feeding said tape to said recording head,
- (d) a reading head being connected to said outlet line and spaced a predetermined distance along said tape from said recording head, and
- (e) a second means for feeding said tape to said reading head, whereby said tape may be taut or slack between said heads thereby having a minimum and variable capacity;

(II) a second information registration means of a limited capacity at least equal to the minimum capacity of said tape between said heads, and being connected also between said incoming line and said outlet line;

(III) means in both said registration means for performing information storing and removing functions in an equivalent manner, and (IV) means connected to and between said first and second registration means for re-transmitting the information stored in said two registration means in the same form in which it was received.

2. A transmission link according to claim 1 including:

(A) means for continually connecting both said registration means to said source of information, and (B) sensing means responsive to the slack and taut conditions of said tape for alternately connecting said registration means to said outlet line, whereby the information from said source is stored in both said registration means.

3. A transmission link according to claim 2 wherein said sensing means includes:

(1) means for reading stored information from said limited capacity registration means when said tape is taut, and until said limited capacity registration means is filled, (2) means for then reading stored information from said variable capacity registration means when said tape is slack, and until the content of information in said variable capacity registration means is equal to its minimum capacity, and (3) means for reading stored information again from said limited capacity registration means when said tape is taut again.

4. A transmission link according to claim 1 including:

(A) means for alternately connecting said two registration means to said source of information, and (B) means for connecting both said registration means in parallel to said outlet.

5. A transmission link according to claim 4 including:

(A) means for first filling said limited capacity registration means with the information coming from said source of information, (B) means for storing further incoming information in said variable capacity registration means, and (C) means for then completely reading out the contents of said limited capacity registration means, and (D) means for then completely reading out the contents of said variable capacity registration means.

6. A transmission link according to claim 5 wherein both said first and second feeding means are normally stopped, and wherein said means for storing further incoming information includes means for starting said first feeding means, and wherein said means for completely reading out the contents of said variable capacity registration means includes means for starting said second feeding means.

7. A transmission link according to claim 5 including:

means for writing in information in said limited capacity registration means after the amount of information remaining in said variable capacity registration means is again equal to the minimum capacity thereof, whereby as many signals can be written in in said limited capacity registration means as there are places occupied in the minimum capacity part of said variable capacity registration means.

8. A transmission link according to claim 6 including:

(1) means for counting from behind up to the next information registered in said variable registration means, and (2) means for switching over the reading taking place from one registration means to the other when there is no information at the place to be taken in that registration means then being read.

9. An information bearing link for communication of a message of telegraph type signals connected between two points wherein the rate of transmission of signals to one point is not the same as the rate of reception of signals from the other point, said link comprising:

(I) a first storing device of limited capacity, (II) a second storing device of unlimited capacity and connected in parallel with said first storing device, said second storing device comprising:

(1) a flexible recording tape, (2) a recording means connected to said one point, (3) a reading means connected to said other point, and spaced a predetermined distance along said tape from said recording means providing a minimum capacity for said tape, (4) a first feeding means for feeding said tape by said recording means, and (5) a second feeding means for feeding said tape by said reading means, whereby said tape may be taut or slack between said recording and reading means thereby having a minimum and variable capacity, said minimum capacity being at least equal to said limited capacity in said first storing device, (III) means for connecting said outgoing signals to both of said storing devices, and (IV) separate means connected between said storing devices and controlled by the number of signals stored in each said storing device relative to the number of signals producing a limited capacity of said limited capacity first storing device for controlling the operation of both said storing devices, said separate means including sensing means responsive to the slack and taut conditions of said tape, whereby when more signals than can be sequentially stored in said limited capacity first storing device are received from said other point, said more signals are stored in said unlimited capacity second storing device.

10. An information bearing link according to claim 9 wherein said separate means includes:

(A) means for storing all received signals on both said storing devices until said first storing device of limited capacity has been filled to its capacity, and (B) means for then storing further received signals on said second storing device of unlimited capacity.

11. An information bearing link according to claim 9 wherein said separate means includes:

(A) means for storing signals only in said limited capacity first storing device until said limited capacity first storing device has been filled to its capacity, and (B) means for then storing further received signals in said unlimited capacity second storing devices.

12. In information bearing link according to claim 11 wherein said first and second feeding means are normally stopped, and wherein said separate means includes:

means for starting said first feeding means when said limited storing device has reached its storing capacity of signals received at said one point.

13. An information bearing link according to claim 9 wherein said separate means includes:

means for removing signals from both said storing devices in the same form and the same sequence as said signals were received by said link.

14. An information bearing link according to claim 9 wherein said sensing means includes an electrical switch.

References Cited by the Examiner

UNITED STATES PATENTS

| | | | |
|---|---|---|---|
| 2,911,622 | 11/1959 | Ayres | 340—172.5 |
| 2,969,522 | 1/1961 | Crosby | 340—172.5 |

OTHER REFERENCES

"IBM 650 Data Processing System Customer Engineering Manual of Instruction" by International Business Machines Corp., 1956, pages 1–12 and IV–1 to IV–4.

ROBERT C. BAILEY, *Primary Examiner.*

IRVING L. SRAGOW, EVERETT R. REYNOLDS, WALTER W. BURNS, Jr., MALCOLM A. MORRISON, *Examiners.*